US007323969B1

(12) United States Patent
Delgado et al.

(10) Patent No.: US 7,323,969 B1
(45) Date of Patent: Jan. 29, 2008

(54) MOBILE INCIDENT RECORDING AND REPORTING SYSTEM

(76) Inventors: Andrew Pedro Delgado, Advanced Homeland Security LLC P.O. Box 631085, Nacogdoches, TX (US) 75963; Arch Michael Price, Advanced Homeland Security LLC P.O. Box 631085, Nacogdoches, TX (US) 75963

( * ) Notice: Subject to any disclaimer, the term of this patent is extended or adjusted under 35 U.S.C. 154(b) by 205 days.

(21) Appl. No.: 11/263,645

(22) Filed: Oct. 31, 2005

Related U.S. Application Data

(60) Provisional application No. 60/624,914, filed on Nov. 4, 2004.

(51) Int. Cl.
*B60Q 1/00* (2006.01)

(52) U.S. Cl. .............................. 340/425.5; 340/426.1; 340/517; 340/521; 340/531; 340/539.1; 340/541; 340/937

(58) Field of Classification Search ............ 340/425.5, 340/426.1, 517, 521, 531, 539.1, 540, 541, 340/933, 937; 348/143, 152; 701/23, 209
See application file for complete search history.

(56) References Cited

U.S. PATENT DOCUMENTS 5,513,244 A * 4/1996 Joao et al. ............... 455/404.1
6,697,103 B1 * 2/2004 Fernandez et al. .......... 348/143

* cited by examiner

*Primary Examiner*—Hung Nguyen
(74) *Attorney, Agent, or Firm*—Buskop Law Group, PC; Wendy Buskop

(57) ABSTRACT

A mobile incident recording and reporting system and method for use in a vehicle for forming at least one data package for reporting of incidents, wherein the system includes a computer system, the computer encrypts and compresses data package. A video and an audio capture device communicating with the computer, a GPS receiver and a magnetic card reader communicates with the computer, a power supply engages the computer, and a power converter and distribution device communicates between the GPS and the computer. A data entry device, Ethernet transceiver, security device to log on, and display communicate with the computer. The system receives data via the GPS receiver forming a continuously updated log, from an audio and video recording and the data entry device, the system links a data file to the audio and video recording and then creates at least one data package.

18 Claims, 1 Drawing Sheet

MOBILE INCIDENT RECORDING AND REPORTING SYSTEM

CROSS REFERENCE TO RELATED APPLICATIONS

The present application claims priority to co-pending U.S. Provisional Patent Application Ser. No. 60/624, 914, filed on Nov. 4, 2004.

FIELD

The embodiments relate to mobile incident recording and reporting systems for audio and video recording, vehicle location logging, and reporting of incidents for use in law enforcement and emergency vehicles.

BACKGROUND

Each year there are over 35 million on-the-road automobile accidents in the United States. Many other vehicles, including water craft and off-road vehicles are also involved in accidents. These can vary from one vehicle to multi-vehicle incidents. These mishaps or accidents cause billions of dollars of property and personal injury damage every year. In most cases, one or more of the parties is at fault, and law enforcement officers, insurance adjusters, and other related individuals are required to find credible witnesses to re-account the incident in order to accurately determine the culpability and liability of the mishap or accident.

Likewise, each year, theft and vandalism of vehicles account for losses that approach the magnitude of those resulting from vehicular accidents. Theft and vandalism are also insured losses that must be handled by insurance carriers. In many cases, the loss is either caused by carelessness or is an "inside job." The insurance industry, which is responsible for investigation and replacement or coverage of the losses, spends millions of dollars investigating such activity, as well as billions of dollars in replacing or compensating policy holders for avoidable losses.

In both of the above scenarios, the recording, storage, and remote access of information relating to the events of an accident or theft which later can be used as reliable evidence would be beneficial in both stream lining accident and vehicle claims and ensuring that only valid claims are compensated. Further, having remote access to this information and the ability to download it while at the scene of the incident would be useful. This remote access will expedite the investigation of an accident or theft, provide accurate medical attention in the event of an accident, assist in the apprehension of perpetrators, and aid in the locating and retrieving of stolen vehicles.

A need exists for a system that can automatically record and store video and audio information stored on a recording system, download that information, and instantaneously transmit the information via a transceiver to the proper authorities, rescue vehicles, hospitals, and/or to an off site storage location. The transmission could be real time or time delayed.

A need exists for a system that incorporates a video output interface to a display screen monitor such that a police officer, rescue unit, hospital, or the like could view the incident in order to provide better assistance.

A need exists for a system that, in addition to video output display, can download, transmit, and display information regarding certain physical phenomenon associated with a vehicular accident or theft, such as vehicle dynamic information including position, speed, acceleration, and also audio, and the like, that had been monitored and recorded by the recording system. The system could be utilized by police, hospitals, rescue workers, and the like in ascertaining certain information, such as the extent of any injuries, determination of fault in an accident, whether a crime is ongoing, and the proper equipment needed for a particular incident.

The present embodiments meet these needs.

BRIEF DESCRIPTION OF THE DRAWINGS

The detailed description will be better understood in conjunction with the accompanying drawings as follows.

Figure 1:
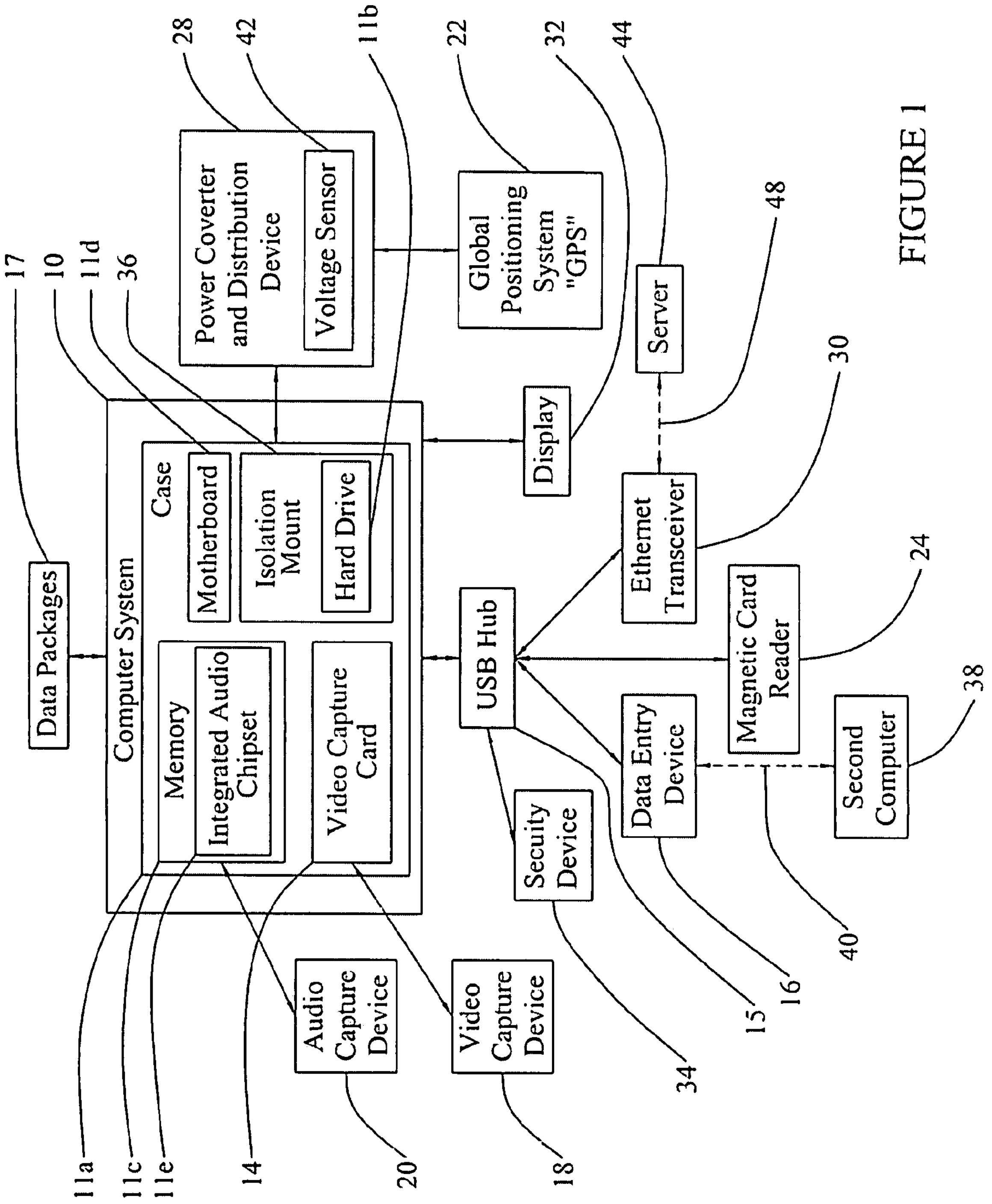
FIG. 1 depicts a schematic of an embodiment of a system of mobile incident recording and reporting.

The present embodiments are detailed below with reference to the listed FIGURE.

DETAILED DESCRIPTION OF THE EMBODIMENTS

Before explaining the present embodiments in detail, it is to be understood that the embodiments are not limited to the particular embodiments and that it can be practiced or carried out in various ways.

The embodiments enable a police officer to safely record a vehicle location and an incident from the police cruiser using real time Global Positioning Satellite (GPS) and time data, for use in court testimony. The embodiments provide fire fighters, border patrol officers, or customs officials a continuous stream of GPS data forming an easy way to identify the location of the emergency vehicle, border patrol vehicle or customs vehicle if there is a need for assistance.

The embodiments allow a supervisor of a patrol officer to obtain real time vehicle location, which identifies a vehicle on patrol or parked at the local donut shop.

With reference to figures, FIG. 1 depicts a schematic of an embodiment of a system of mobile incident recording and reporting. The embodiments can be adapted to do vehicle location logging, and reporting of incidents for use in vehicles such as police cars, emergency ambulances, fire trucks, rescue vehicles, customs cruisers, border patrol devices, and other devices.

The mobile incident recording and reporting system includes a mini-itx computer system (10). The mini-itx computer system (10) can include a case (11*a*) with hard drive (11*b*), memory (11*c*), motherboard (11*d*) and integrated audio chipset (11*e*) and a video capture card (14). The mini-itx computer system (10) engages a USB hub (15). A mini-itx computer is a computer built to the design standard form factor by IEEE. The components for this computer system can be purchased from Axion Technologies of Houston, Tex. A video capture card such as a K-world number 878RF-Pro can be used. A conventional USB hub from Best Buy™ can be used.

In one embodiment, an isolation mount (36) can be used encapsulating the hard drive (11*b*) to prevent damage from shock and vibration.

Additionally, a data entry device (16) can be connected to the USB hub. As an example, a Zippy EL-610 keyboard available from Axion Technologies can be used. Examples of the data entry device (16) include a personal digital assistant, a palm computer, a tablet pc, an interactive touch screen, a mouse, chordal character entry device or combination thereof. The data entry device can be wirelessly connected, such as a Bluetooth™ device to communicate to a second computer (38) which is in communication with the mini-itx computer system.

In another embodiment, the data entry device can be a second computer (38) connected to the mini-itx computer (10) via a network (40).

A video capture device (18) links and communicates with the video capture card. For example, the video capture device (18) can be a mounted Sony video camera. Other examples of a video capture device (18) include a digital video camera, a thermal video camera, an infrared video camera, a digital phone, or combinations thereof.

An audio capture device (20) communicates with the mini-itx computer system. An example of an audio capture device (20) is a microphone, such as a Shure microphone. The microphone can be wireless, or can be hard wired to the computer system. A radio receiver, a telephone or combination thereof can also be used in wired or wireless configuration to the system.

A global positioning system (GPS) receiver (22) communicates with a power converter and distribution device (28). An example GPS receiver is a conventional vehicle mountable receiver such as those available from GPS City, of Las Vegas, Nev.

A magnetic card reader (24) communicates with the USB hub. Magnetic card readers can be obtained from various manufacturers including ones made by Access Keyboards Ltd, Unit 18 Suttons Business Park, of Reading, UK.

In one embodiment, the magnetic card reader can be an at least three track magnetic card reader.

A power supply, not depicted in FIG. 1, can engage the mini-itx computer system. The power supply can be a 12 volt power supply, but it could be 24 volt. In one embodiment, a power supply initiates the mobile incident recording and reporting system at least 5 seconds after ignition of the vehicle is initiated. Alternatively, the mobile incident recording and reporting system can be initiated between 5 seconds and 20 seconds after ignition of the vehicle.

A power converter and distribution device (28) communicates between the GPS and the mini-itx computer system. The power converter and distribution device is available from Advanced Homeland Security of Nacogdoches, Tex. An example power converter and distribution device can provide 5 volt DC output to the GPS receiver.

In one embodiment, the power converter and distribution device can be a voltage sensor (42) for initiating recording when specialty warning lights of the vehicle are turned on.

An Ethernet transceiver (30) can engage the USB hub. Examples of Ethernet transceivers include 802.11a IEEE standard firmwares, 802.11b IEEE standard firmwares, 802.11g IEEE standard firmwares or combinations thereof.

A server (44) can receive data packages (17) from the system via the Ethernet transceiver. The server (44) communicates with directly to the Ethernet transceiver (30) via a second network (48).

A display (32), such as a computer monitor, can be used in communication with the mini-itx computer. The display (32) can be an LCD video display, a cathode ray tube, or combinations of these and the television or computer monitor.

A security device (34) can be connected to the USB hub. For example, a fingerprint biometrics scanning device can be used. Other examples include voice print identifiers and retinal scanners. Other examples of security devices include magnetic sensing devices, radio frequency sensors, or combinations thereof. The radio frequency sensor can be a proximity sensor that identifies an individual wearing a radio frequency identification device (RFID)

The embodiments relate to methods for recording audio, video and satellite data with a real time data entry feature on a vehicle. The methods entail actuating a mobile incident system mounted on a vehicle wherein the system comprises a mini-itx computer system with set video capture card and USB hub, a data entry device, a video capture device, an audio capture device, a global positioning system (GPS) receiver, a magnetic card reader, a power supply, a power converter and distribution system, an Ethernet transceiver, a display and a security device. The system can be actuated by turning the key in the ignition of the vehicle or by using a wireless remote.

The methods continue by logging on a potential operator of the system using the security device to verify the potential operator is authorized to use the system and has an operator identification. The operator identification is a number, a prerecorded biometric scan, an alpha numeric code, or combinations thereof. The authorization of the operator can occur by scanning the biometrics of the operator. Alternatively, the authorization of the operator can be sensed by a magnetic sensing device, a radio frequency sensing device, or combinations thereof.

After authorizing the operator to use the system, the system is linked to a satellite using the GPS receiver to obtain a longitude and a latitude of the vehicle and current Greenwich Mean Time. The information from the satellite is received using the mini-itx computer system, thereby forming a continuously updating log. The received satellite information can be updated 2 and 3 times per second during the recording.

On demand of the user, the user can access video, audio, or combinations thereof while encoding date, time, operator identification, longitude and latitude of the vehicle from the continuously updating log forming a coded recording.

The coded recording can be stopped by depressing a function key on the data entry device or triggering a remote device wirelessly connected to the system. The system can provide an operator a selection of choices. For example, the operator can input data via the data entry device, wherein the data entry device includes an identification number and a custom field for information entry. In another example, the operator can press a function key on the data entry device to exit the system. Additionally, the network can permit the operator to write a report in a template provided by the system providing additional details pertaining to the coded recording. The report can be written using the data entry device, the magnetic card reader, or combinations thereof.

The methods can allow for encrypting and compressing the continuously updating log with the coded recording forming one or more data packages. The one or more data packages can be transmitted to a server (44) using the wireless Ethernet transceiver. Encrypting and compressing the continuously updating log with the coded recording can create a report which constitutes at least one data package. The data packages can then be transmitted to a server (44) using the wireless Ethernet transceiver.

The recording by the system of the method is performed using a member selected from the group consisting of: the data entry device of the system, a voltage sensor, a remote device, and combinations thereof.

The methods can include the initiation of the recording by either depressing a function key on the data entry device, actuating warning lights mounted on the vehicle connected to the voltage sensor, or trigger a remote device wirelessly connected to the system.

While these embodiments have been described with emphasis on the preferred embodiments, it should be understood that within the scope of the appended claims, the embodiments might be practiced other than as specifically described herein.

What is claimed is:

1. A mobile incident recording and reporting system for use in a vehicle for forming at least one data package for reporting of incidents, wherein the system comprises:

a. a mini-itx computer system engaging a USB hub, and wherein the mini-itx computer is adapted to encrypt and compress a data package;

b. a data entry device connected to the mini-itx computer system and the USB hub;

c. a video capture device and an audio capture device in communication with the mini-itx computer system;

d. a global positioning system (GPS) receiver communicating with the mini-itx computer system;

e. a magnetic card reader in communication with the USB hub;

f. an Ethernet transceiver engaging the USB hub; and g. a display in communication with the mini-itx computer; wherein the mini-itx computer system receives global positioning data via the GPS receiver from a satellite forming a continuously updating log, forms an audio and video recording based on actuation using the data entry device, links an data file to the audio and video recording and then creates at least one data package using the linked data file, audio and video recording and continuously updating log.

2. The system of claim 1, wherein the a mini-itx computer system comprises a case with a hard drive, memory, a motherboard, an integrated audio chipset and a video capture card.

3. The system of claim 1, further comprising a security device connected to the USB hub, and wherein the system is engaged using the security device.

4. The system of claim 1, further comprising an isolation mount encapsulating the hard drive to prevent damage from shock and vibration.

5. The system of claim 1, wherein the data entry device comprises a wirelessly connected second computer in communication with the mini-itx computer system.

6. The system of claim 1, wherein the data entry device is a second computer connected to the mini-itx computer via a network.

7. The system of claim 1, wherein the security device is a fingerprint reader, an eye retinal reader, or voice print identification device, a magnetic sensing device, a radio frequency sensor, or a combination thereof.

8. The system of claim 1, wherein the radio frequency sensor is a proximity sensor that identifies an individual wearing a radio frequency identification device (RFID).

9. The system of claim 1, wherein the power converter and distribution device comprises a voltage sensor for initiating recording when specialty warning lights of a vehicle are turned on.

10. The system of claim 1, wherein a power supply initiates the mobile incident recording and reporting system at least 5 seconds after ignition of the vehicle is initiated.

11. The system of claim 1, further comprising a server for receiving data packages from the system via the Ethernet transceiver.

12. A method for recording audio, video and satellite data with a real time data entry feature on a vehicle comprising the steps of:

a. actuating a mobile incident system mounted on a vehicle wherein the system comprises a mini-itx computer system with set video capture card and USB hub, a data entry device, a video capture device, an audio capture device, a global positioning system (GPS) receiver, a magnetic card reader, a power supply, a power converter and distribution system, an Ethernet transceiver, a display and a security device;

b. logging on a potential operator of the system using the security device to verify the potential operator is authorized to use the system and has an operator identification;

c. after authorizing the operator to use the system, linking the system to a satellite using the GPS receiver to obtain a longitude and a latitude of the vehicle and current Greenwich Mean time;

d. receiving information from the satellite using the mini-itx computer system forming a continuously updating log;

e. where in updating the log comprises, recording a member of the group: video, audio, or combinations thereof while encoding date, time, operator identification, longitude and latitude of the vehicle from the continuously updating log forming a coded recording; and f. stopping coded recording by depressing a function key on the data entry device or triggering a remote device wirelessly connected to the system.

13. The method of claim 12, further comprising the step allowing the operator to input data via the data entry device, wherein the data entry device comprises an identification number and a custom field for information entry.

14. The method of claim 12, further comprising the step of permitting the operator to write a report in a template provided by the system providing additional details pertaining to the coded recording.

15. The method of claim 12, further comprising the step of encrypting and compressing the continuously updating log with the coded recording, forming at least one data package and transmitting the at least one data package to a server using the wireless Ethernet transceiver.

16. The method of claim 12, further comprising the step of updating the received satellite information between 2 and 3 times per second during the recording.

17. The method of claim 12, wherein the step of initiating of the recording is by either depressing a function key on the data entry device, actuating warning lights mounted on the vehicle connected to the voltage sensor, or triggers a remote device wirelessly connected to the system.

18. The method of claim 12, wherein the step of actuating the mobile incident system is performed by turning the key in the ignition of the vehicle or by pressing a wireless remote.

* * * * *